US010644785B2

(12) United States Patent
Hansen et al.

(10) Patent No.: US 10,644,785 B2
(45) Date of Patent: May 5, 2020

(54) WIRELESS DISTRIBUTION OF AIRCRAFT DATA AND/OR AVIONICS PARAMETERS AND/OR CONTROL COMMANDS BETWEEN A STANDARDIZED AIRCRAFT INTERFACE POINT AND OTHER SYSTEMS, E.G., PASSENGER ENTERTAINMENT SYSTEMS

(71) Applicant: Airbus Operations GmbH, Hamburg (DE)

(72) Inventors: Thomas Hansen, Hamburg (DE); Christian Schaupmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/802,600

(22) Filed: Nov. 3, 2017

(65) Prior Publication Data
US 2018/0123679 A1 May 3, 2018

Related U.S. Application Data

(60) Provisional application No. 62/416,995, filed on Nov. 3, 2016.

(51) Int. Cl.
*H04N 21/214* (2011.01)
*H04B 7/185* (2006.01)
(Continued)

(52) U.S. Cl.
CPC ..... *H04B 7/18506* (2013.01); *B64D 11/0015* (2013.01); *B64D 11/00155* (2014.12);
(Continued)

(58) Field of Classification Search
CPC ......... H04N 21/2146; H04N 21/41407; H04N 21/43637; G07C 5/008; H04W 4/04; B64D 11/0015; B64D 11/00155; H04B 7/18506
See application file for complete search history.

(56) References Cited

U.S. PATENT DOCUMENTS 6,483,865 B1 * 11/2002 Beierle ............... H04B 1/3805
375/130
7,236,858 B2 * 6/2007 Carpenter ................ G06F 1/26
701/15
(Continued)

FOREIGN PATENT DOCUMENTS

| EP | 2978187 | 1/2016 |
|---|---|---|
| WO | 2011141702 | 11/2011 |
| WO | 2014187869 | 11/2014 |

OTHER PUBLICATIONS

Provisional Search Report.

*Primary Examiner* — Nasser M Goodarzi
*Assistant Examiner* — Patrick A Ryan
(74) *Attorney, Agent, or Firm* — Greer, Burns & Crain Ltd.

(57) ABSTRACT

A system for wireless distribution of aircraft data, avionics parameters or control commands between a standardized aircraft interface point and other systems, including a portable in-flight entertainment (IFE) server. The system comprises an aircraft data system with avionics buses for carrying at least one of aircraft data, avionics parameters or control commands. A first module is configured to directly interface with the avionics buses, in order to read/write data. A second module is configured to combine/adapt the data and generate signals of the combined/adapted data. A third module is configured to transmit the signals from the second module via wireless standard protocols towards the portable (Continued)

IFE server. The IFE server is configured to receive the signals from the third module.

5 Claims, 1 Drawing Sheet

(51) Int. Cl.
  *B64D 11/00* (2006.01)
  *G07C 5/00* (2006.01)
  *H04W 4/42* (2018.01)
  *H04N 21/4363* (2011.01)
  *H04N 21/414* (2011.01)

(52) U.S. Cl.
  CPC ......... *G07C 5/008* (2013.01); *H04N 21/2146* (2013.01); *H04N 21/41407* (2013.01); *H04N 21/43637* (2013.01); *H04W 4/42* (2018.02)

(56) References Cited

U.S. PATENT DOCUMENTS

| | | | |
|---|---|---|---|
| 8,369,848 B1 | 2/2013 | Lopes et al. | |
| 9,043,938 B1* | 5/2015 | Raghu | H04W 12/06 726/28 |
| 2009/0058682 A1* | 3/2009 | True | H04L 12/66 340/971 |
| 2013/0314257 A1 | 11/2013 | Macrae et al. | |
| 2014/0013365 A1* | 1/2014 | Ezaki | H04N 21/2146 725/77 |
| 2015/0005989 A1* | 1/2015 | Beltrand | B64C 19/00 701/3 |
| 2015/0120097 A1* | 4/2015 | Hathaway | B64C 19/00 701/14 |
| 2016/0083091 A1 | 3/2016 | Elias | |
| 2016/0134920 A1 | 5/2016 | Bleacher et al. | |
| 2016/0285542 A1 | 9/2016 | Du | |
| 2017/0302684 A1 | 10/2017 | Kirk et al. | |

* cited by examiner

WIRELESS DISTRIBUTION OF AIRCRAFT DATA AND/OR AVIONICS PARAMETERS AND/OR CONTROL COMMANDS BETWEEN A STANDARDIZED AIRCRAFT INTERFACE POINT AND OTHER SYSTEMS, E.G., PASSENGER ENTERTAINMENT SYSTEMS

CROSS-REFERENCES TO RELATED APPLICATIONS

This application claims the benefit of the U.S. Provisional Application No. 62/416,995, filed on Nov. 3, 2016, the entire disclosures of which are incorporated herein by way of reference.

TECHNICAL FIELD

The present invention relates to wireless distribution of aircraft data and/or avionics parameters and/or control commands in an aircraft.

BACKGROUND OF THE INVENTION

Future in-flight passenger entertainment systems (IFE) may comprise a stand-alone fully autonomous carry-on, battery-powered portable server device, with wireless audio/video signal broadcast to passenger owned portable devices (e.g., tablets, smartphones, laptops) via WiFi. Such a portable server today has no interface with the aircraft (for example, see the devices described at http://www.blueboxavionics.com/products/bluebox-wow/).

The disadvantage is that such a system, having no interface with the aircraft, cannot send or receive data to/from the aircraft systems (e.g., to mute/pause audio/video during a PA announcement, receive flight data used for flight information to passengers ("Airshow"), aircraft camera or audio feeds ("Landscape/Taxi Cam"), send data to control reading lights, etc.

SUMMARY OF THE INVENTION

The present invention comprises three parts (which may be combined within one box if useful for a/c integration):

Part (a) directly interfaces with avionics buses, in order to read/write data.

This part (a) may be modular, in order to comply with different type of aircraft families (including non-Airbus) and different kind of avionics data buses (e.g. ARINC429, Discretes, Ethernet, AFDX™ networks, . . . ).

Part (b) combines/adapts the data (and may provide a security function and/or processing, if needed).

This part (b) may be modular, in order to comply with growing demands, e.g., regarding data security and to provide standardization between part (a) and part (c) so that the invention could be easily configured for different types of aircraft (including non-Airbus) and different suppliers of the IFE server.

Part (c) transmits those signals via wireless standard protocols, e.g., WiFi, towards the portable IFE server.

This part (c) may be modular and configurable, in order to adapt easily to future new wireless standards and to comply easily with different suppliers of the IFE server.

Part (c) would be configured towards the IFE server as a "client." It shall be "invisible" to the passengers' portable devices (e.g., via hidden SSID and—if required—other protection mechanisms).

The invention is considered to be a part of the aircraft, installed either in line fit, or retro fit. If the parts are combined within one box, the box may be installed within, e.g., the avionics bay, whereas a separate antenna may be installed, e.g., in the cabin ceiling area.

If the parts are separated, then part (a) and part (b) may be installed within, e.g., the avionics bay, whereas part (c) including the antenna may be installed, e.g., in the cabin ceiling area.

Any or all parts of the invention may also be integrated into other aircraft equipment, e.g., a flight attendant panel.

For example, part (a) is reading several aircraft data buses in parallel, to fetch/filter the desired data. Part (b) would then put the data into the wanted (serial) sequence. Part (c) would transmit the data stream towards the portable IFE server (located somewhere inside the passenger cabin, e.g., inside a hatrack) via a standardized wireless (WiFi) link. The IFE server then could use such data either for internal functions (e.g., automatic start of service, depending, e.g., on flight phase), or to forward the data directly to the passenger's portable devices, where, e.g., an "Airshow APP" could process such data, and to display information related to the flight (position, speed, outside temp, time to destination, etc.) to the passenger.

Another example to use such kind of data may be, e.g., "A Fear of Flight" APP (also running on the passenger's device) that explains to the passengers what's currently happening with the aircraft (e.g., "The noise that you currently hear is due to landing gear extension").

Another example: The passenger may have an APP on his mobile device that allows him to control the reading light at his seat. The portable IFE server would receive the command and send it to part (c). Then, part (b) would provide a security function and addresses the corresponding port of part (a) which would then inject the signal into the aircraft data bus.

If more than one portable IFE server should be installed (e.g., for larger aircraft: one in the forward area, another one in the aft area), then that IFE server which receives the aircraft data from the new device would forward that data to the other IFE server so that the related passengers could also receive the data.

Another possibility of achieving this this may be that the new device would "feed" the data to the other IFE server via an additional antenna, located close to the second IFE server.

The invention may also be used for other applications than IFE, e.g. to transmit avionics data to a portable maintenance device.

BRIEF DESCRIPTION OF THE DRAWINGS

Preferred exemplary embodiments of the invention with additional design details and additional advantages are described and explained in greater detail below with reference to the accompanying drawings

DETAILED DESCRIPTION OF THE PREFERRED EMBODIMENTS

Figure 1:
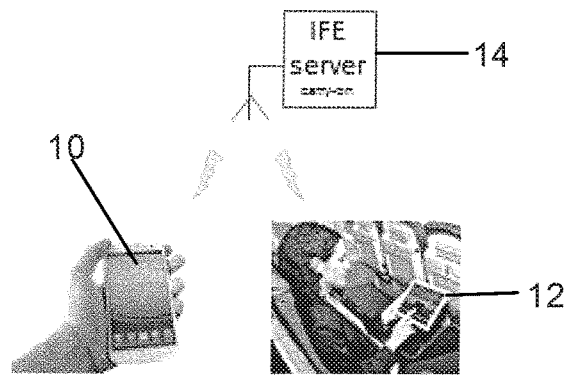
FIG. 1 shows a schematic diagram of the prior art arrangement for operation of the in-flight entertainment (IFE) system and server.

FIG. 1 shows a prior art arrangement for operation of the in-flight entertainment system 10, 12 and server 14 as a stand-alone system, with no interface with the aircraft communications systems.

Figure 2:
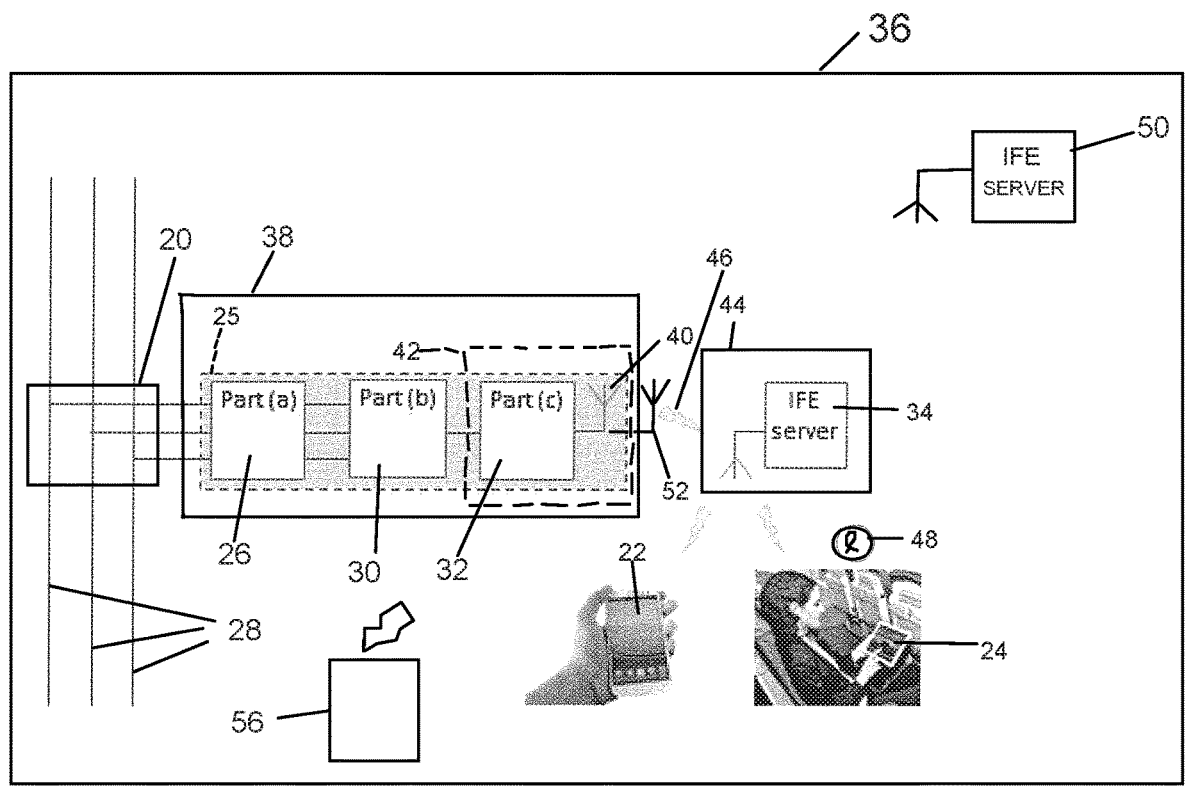
FIG. 2 shows a schematic diagram for the wireless distribution of aircraft data and/or avionics parameters and and/or control commands between a standardized aircraft interface point and other systems, e.g., passenger entertainment systems according to the invention.

FIG. 2 shows a schematic diagram for the wireless distribution of aircraft data and/or avionics parameters and and/or control commands between a standardized aircraft interface point 20 and other systems 22, 24, e.g., passenger entertainment systems according to the invention.

The device 25 of present invention comprises three parts (which may be combined within one box if useful for aircraft integration):

Part (a) may be a module 26 configured to directly interface with avionics buses 28, in order to read/write data.

This part (a) may be modular, in order to comply with different types of aircraft families (including non-Airbus) and different kinds of avionics data buses (e.g. ARINC429, Discretes, Ethernet, AFDX™ networks, . . . ).

Part (b) may be a module 30 configured to combine/adapt the avionics data (and may provide a security function and/or processing, if needed) and generate signals representing the combined/adapted avionics data.

This part (b) may be modular, in order to comply with growing demands, e.g., regarding data security and to provide standardization between part (a) 26 and part (c) 32 so that the invention could be easily configured for different types of aircraft (including non-Airbus) and different suppliers of the IFE server 34 (or other types of portable electronic device servers).

Part (c) may be a module 32 configured to transmit those signals via wireless standard protocols, e.g., WiFi, towards the portable IFE server 34.

This part (c) 32 may be modular and configurable, in order to adapt easily to future new wireless standards and to comply easily with different suppliers of the IFE server 34.

Part (c) 32 would be configured towards the IFE server 34 as a "client." It shall be "invisible" to the passengers' portable devices (e.g., via hidden SSID and—if required—other protection mechanisms).

The invention is considered to be a part of an aircraft 36, installed either in line fit, or retro fit. If the parts are combined within one box, the box may be installed within, e.g., the avionics bay 38, whereas a separate antenna 40 may be installed, e.g., in the cabin ceiling area.

If the parts are separated, then part (a) 26 and part (b) 30 may be installed within, e.g., the avionics bay, whereas part (c) 32 including the antenna may be installed, e.g., in the cabin ceiling area.

Any or all parts of the invention may also be integrated into other aircraft equipment, e.g., a flight attendant panel 42.

For example, part (a) 26 is reading several aircraft data buses in parallel, to fetch/filter the desired data. Part (b) 30 would then put the data into the wanted (serial) sequence. Part (c) 32 would transmit the data stream towards the portable IFE server 34 (located somewhere inside the passenger cabin, e.g., inside a hat rack or luggage compartment 44) via a standardized wireless (WiFi) link 46. The IFE server 34 then could use such data either for internal functions (e.g., automatic start of service, depending, e.g., on flight phase), or to forward the data directly to the passenger's portable devices 22, 24, where, e.g., an "Airshow APP" could process such data, and to display information related to the flight (position, speed, outside temp, time to destination, etc.) to the passenger.

Another example to use such kind of data may be, e.g., "A Fear of Flight" APP (also running on the passenger's device) that explains to the passengers what's currently happening with the aircraft (e.g., "The noise that you currently hear is due to landing gear extension").

Another example: The passenger may have an APP on his mobile device 22, 24 that allows him to control a reading light 48 at his seat. The portable IFE server 34 would receive the command and send it to part (c) 32. Then, part (b) 30 would provide a security function and addresses the corresponding port of part (a) 26 which would then inject the signal into the aircraft data bus 28.

If more than one portable IFE server 34, 50 should be installed (e.g., for larger aircraft: one 34 in the forward area, another one 50 in the aft area), then that IFE server 34 which receives the aircraft data from the new device 20 would forward that data to the other IFE server 50 so that the related passengers could also receive the data.

Another possibility of achieving this this may be that the device 25 would "feed" the data to the other IFE server via an additional antenna 52, located close to the second IFE server 50.

The device 25 may also be used for other applications than in-flight entertainment, e.g., to transmit avionics data to a portable maintenance device 56.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for wireless distribution of aircraft data, avionics parameters, or control commands between an aircraft data system and a portable electronic device server, the system comprising:
    an aircraft data system with avionics buses for carrying at least one of aircraft data, avionics parameters, or control commands;
    a portable electronic device server in wireless communication with the aircraft data system and at least one portable electronic device, the portable electronic device server comprising an in-flight passenger entertainment server; and,
    a device for relaying the at least one of aircraft data, avionics parameters or control commands from the aircraft data system to the portable electronic device server, the device comprising a plurality of discrete parts, a port directly interfacing with the avionics buses of the aircraft data system, and an antenna for sending signals to and receiving signals from the portable electronic device server, wherein communication between the aircraft data system and the at least one portable electronic device occurs only through the portable electronic device server, and, wherein the signals sent to the portable electronic device server via the antenna of the device comprise the at least one of aircraft data, avionics parameters, or control commands from the aircraft data system.

2. The system according to claim 1, wherein the device is located in an avionics bay of the aircraft.

3. The system according to claim 1, wherein the device is located in a flight attendant panel.

4. The system according to claim 1, wherein the portable electronic device server is located in a cabin luggage compartment.

5. The system according to claim 1, further comprising a second portable electronic device server, the second portable electronic device server located in a different part of a passenger cabin of the aircraft than the first portable electronic device server.

* * * * *